US006803427B2

(12) United States Patent
Yang et al.

(10) Patent No.: US 6,803,427 B2
(45) Date of Patent: Oct. 12, 2004

(54) METHOD FOR PRODUCING ETHYLENE HOMO- AND CO-POLYMER

(75) Inventors: Chun-Byung Yang, Taejon-shi (KR); Sang-Yull Kim, Taejon-shi (KR); Weon Lee, Taejon-shi (JP)

(73) Assignee: Samsung General Chemicals Co., Ltd. (KR)

( * ) Notice: Subject to any disclaimer, the term of this patent is extended or adjusted under 35 U.S.C. 154(b) by 417 days.

(21) Appl. No.: 09/866,499

(22) Filed: May 25, 2001

(65) Prior Publication Data

US 2002/0037980 A1 Mar. 28, 2002

(30) Foreign Application Priority Data

May 31, 2000 (KR) .......................................... 2000/29465

(51) Int. Cl.[7] .......................... C08F 4/26; C08F 210/02
(52) U.S. Cl. ................ 526/123.1; 526/128; 526/125.1; 526/124.3; 526/142; 526/348; 502/115; 502/120; 502/125; 502/126; 502/127; 502/103
(58) Field of Search ............................ 526/123.1, 128, 526/125.1, 124.3, 142, 348; 502/115, 120, 125, 126, 127, 103

(56) References Cited

U.S. PATENT DOCUMENTS

| 3,878,124 A | 4/1975 | Durand et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |

(List continued on next page.)

FOREIGN PATENT DOCUMENTS

| DE | 2 153 520 | 5/1972 |
| DE | 2 230 672 | 12/1972 |
| DE | 2 230 728 | 12/1972 |
| DE | 2 230 752 | 12/1972 |
| DE | 26 05 922 | 8/1976 |
| DE | 25 53 104 | 6/1977 |
| DE | 25 04 036 | 8/1978 |
| EP | 0 350 170 | 3/1994 |
| EP | 0 606 125 | 5/1997 |
| EP | 0 602 922 | 1/1998 |

OTHER PUBLICATIONS

Abstracts of BE895019 published Mar. 1983, DE3241999 published May 1983, GB2111066 published Jun. 1983, and US4952649 published Aug. 1990, printed from Dialog Web.
Abstract of JP7316987 published Dec. 1995.
Abstract of JP52087486 published Jul. 1977.
Abstract of JP54040239 published Mar. 1979.
Abstract of JP58083006 published May 1983.
Abstract of JP63054004 published Mar. 1988.
Abstract of JP63191811 published Aug. 1988.
Abstract of JP63040711 published Feb. 1988.
Abstract of JP51136625 published Nov. 1976.
Abstract of KR9202488 published Jan. 1990.
Abstract of KR9300665 published Sep. 1990.
Abstract of JP7316986 published Dec. 1995.
Abstract of CA1040379 published Oct. 1978.

Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623–2624.

Edelmann, "N–silylated benzamidines: versatile building blocks in main group and coordination chemistry," Coordination Chemistry Reviews, vol. 137, 1994, pp. 403–481.

Zhou et al., "Synthesis and Structure of Novel Bridged Dinuclear Indium Complexes," Inorg. Chem., 1996, vol. 35, pp. 1423–1424.

Zhou et al., "Bulky Amidinate Complexes of Tin(IV). Synthesis and Structure of Sn(RNC(R')NR)$_2$C2$_2$ (R=Cyclohexyl, R'=H, Me; R=SiMe$_3$, R'=$^t$Bu)," Inorg. Chem., 1997, vol. 36, p. 501–504.

Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Stokes et al., "Reactions of Cobaloxime Anions and/or Hydrides with Enynes as a New, General Route to 1,3– and 1,2–Dienylcobaloxime Complexes," Organometallics, 1996, vol. 15, pp. 2624–2632.

Primary Examiner—Ling-Siu Choi
(74) Attorney, Agent, or Firm—Meyertons, Hood, Kivlin, Kowert & Goetzel, P.C.; Eric B. Meyertons

(57) ABSTRACT

The present invention relates to a method for producing a polymer and copolymer of ethylene, and more particularly to a method for producing an ethylene polymer and copolymer by reacting a compound of an organic metal of Group 2, 12, or 13 on the periodic table of elements with an alkoxy silane compound in the presence of a titanium catalyst, the said titanium catalyst being produced by a process of preparing a magnesium compound by contact-reacting a halogenated magnesium compound and alcohol, of reacting the said solution with an ester compound which contains at least one hydroxy group and a silicon compound containing an alkoxy group, and also of reacting it with a solid matter obtained by reaction of a mixture of a titanium compound and a silicon compound with a titanium compound. The catalyst used in polymerization and copolymerization of ethylene in the present invention is high in catalytic activity, and the polymer produced by the use of this catalyst has the merits of a high bulk density and a narrow molecular weight distribution.

21 Claims, No Drawings

U.S. PATENT DOCUMENTS

| | | | |
|---|---|---|---|
| 4,085,276 A * | 4/1978 | Toyota et al. ............... 526/122 |
| 4,107,413 A | 8/1978 | Giannini et al. |
| 4,107,414 A | 8/1978 | Giannini et al. |
| 4,156,063 A | 5/1979 | Giannini et al. |
| 4,157,435 A | 6/1979 | Toyota et al. |
| 4,187,196 A | 2/1980 | Giannini et al. |
| 4,220,554 A | 9/1980 | Scatá et al. |
| 4,226,963 A | 10/1980 | Giannini et al. |
| 4,315,835 A | 2/1982 | Scatá et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,399,054 A | 8/1983 | Ferraris et al. |
| 4,401,589 A | 8/1983 | Kioka et al. |
| 4,439,540 A | 3/1984 | Cecchin et al. |
| 4,477,639 A | 10/1984 | Nielsen |
| 4,518,706 A | 5/1985 | Gessell |
| 4,613,655 A | 9/1986 | Longi et al. |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbé et al. |
| 4,988,656 A | 1/1991 | Arzoumanidis et al. |
| 4,990,479 A | 2/1991 | Ishimaru et al. |
| 5,013,702 A | 5/1991 | Arzoumanidis et al. |
| 5,059,570 A | 10/1991 | Bailly et al. |
| 5,061,667 A | 10/1991 | Murata et al. |
| 5,081,090 A | 1/1992 | Arzoumanidis et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A * | 1/1993 | Arzoumanidis et al. .... 502/115 |
| 5,419,116 A | 5/1995 | Rast et al. |
| 5,459,116 A | 10/1995 | Ro et al. |
| 5,502,128 A | 3/1996 | Flores et al. |
| 5,585,317 A | 12/1996 | Sacchetti et al. |
| 5,587,440 A | 12/1996 | Ehlers et al. |
| 5,726,261 A | 3/1998 | Sacchetti et al. |
| 5,780,378 A | 7/1998 | Toida et al. |
| 5,844,046 A | 12/1998 | Ohgizawa et al. |
| 5,849,654 A | 12/1998 | Fushimi et al. |
| 5,968,862 A | 10/1999 | Abbott et al. |

* cited by examiner

METHOD FOR PRODUCING ETHYLENE HOMO- AND CO-POLYMER

TECHNICAL FIELD

The present invention relates to a method for preparing an ethylene polymer or copolymer, and more particularly a method for producing, by use of a catalyst of high activity, an ethylene polymer or copolymer with high bulk density and a narrow molecular weight distribution.

DESCRIPTION OF THE RELEVANT ART

Magnesium-containing catalysts for production of ethylene polymer or copolymer are known to have very high catalytic activity and endow the produced polymer with a high bulk density. They are also known to be suitable for both liquid and gaseous reactions alike. The liquid polymerization of ethylene means the reaction taking place in the state of bulk ethylene or in a medium like isopentane and hexane, and in terms of the adaptability of a catalyst in such reactions its high activity and the resultant bulk density of a polymer are features of importance. A significant variable decisive of the properties of an ethylene polymer or copolymer, produced with the use of such a catalyst, is the molecular weight distribution. A narrow molecular weight distribution is very advantageous in later manufacture of injection products.

Many catalysts containing magnesium and titanium for production of olefin and the processes for production of these catalysts have been reported. In particular, many processes making use of magnesium solutions to obtain catalysts for polymerization of olefin which has a high bulk density, have been learned. They include processes to obtain magnesium solutions by reacting magnesium compounds with such electron donors as alcohol, cyclic ether, organic carboxyl acid, etc., in the presence of hydrocarbon solvents. Instances where alcohol was used are referred to in U.S. Pat. Nos. 4,330,649 and 5,106,807. Methods for producing a magnesium-carrying catalyst by reacting a magnesium solution with halogen compounds such as titanium tetrachloride are well known. There have also been efforts to control the catalyst's activity and the polymer's molecular weight distribution by addition of ester compounds. These catalysts have a merit in providing the polymer's high bulk density, but their catalytic activity and the polymer's molecular weight distribution have something yet to be improved. Tetrahydrofuran, a cyclic ester, has been used as a magnesium compound solvent in U.S. Pat. Nos. 4,477,639 and 4,518,706.

Meanwhile, U.S. Pat. Nos. 4,847,639, 4,816,433, 4,829,037, 4,970,186, and 5,130,284 have reported use of electron donors such as magnesium alkoxide, dialkylphthalate, phthaloyl chloride, etc., in reaction with a titanium chloride compound for production of catalysts with high catalytic activity and the resultant olefin's improved bulk density.

U.S. Pat. No. 5,459,116 has reported a method for production of a titanium-carrying solid catalyst by reacting a magnesium solution containing an ester having at least one hydroxy group as electron donor with a titanium compound. By this method it is possible to obtain a catalyst which is excellent in catalytic activity, and provides the resultant polymer with high bulk density, but the polymer has something yet to be improved in its molecular weight distribution.

Use of external electron donors in polymerization of α-olefin, especially polypropylene for improvement of stereoregularity, is generally known, and is, commercially, in wide use. As external electron donors, alkoxysilane compounds are widely known, but it is also known that, although the polymer's stereoregularity improves with the use of these, generally the polymer's molecular weight distribution becomes relatively broad. KP 93-665 has shown a way and its merit of rendering the polymer's molecular weight distribution narrower by the use of organic silane as an external electron donor in polymerization of propylene.

SUMMARY OF THE INVENTION

An objective of the present invention is to provide a method and catalyst for production of an ethylene polymer or copolymer with a large bulk density, and a narrow molecular weight distribution; and more particularly, a method and catalyst for producing an ethylene polymer or copolymer of well-regulated granular forms, high polymerization activity, and a narrow molecular weight distribution.

DETAILED DESCRIPTION OF THE PREFERRED EMBODIMENTS

The process of the embodiment described herein for producing an ethylene polymer or copolymer involves preparing a solid titanium complex catalyst in a simple yet effective process using magnesium, titanium, halogen, and an electron donor, by:

i. producing a magnesium compound solution by contact-reacting a halogenated magnesium compound and alcohol, ii. reacting the said solution with an ester compound containing at least one hydroxy group and a silicon compound containing an alkoxy group, and iii. adding thereto a mixture of a titanium compound and a silicon compound.

An ethylene polymerization or copolymerization is then performed with a compound of an organic metal of Group 2, 12, or 13 on the periodic table of elements by the use of the aforesaid catalyst in the presence of an alkoxy silane compound.

Examples of halogenated magnesium compounds which may be used in production of the catalyst include such dihalogenated magnesiums as magnesium chloride, magnesium iodide, magnesium fluoride, and magnesium bromide; such alkylmagnesium halides as methylmagnesium halide, ethylmagnesium halide, propylmagnesium halide, butylmagnesium halide, isobutylmagnesium halide, hexylmagnesium halide, and amylmagnesium halide; such alkoxymagnesium halides as methoxymagnesium halide, ethoxymagnesium halide, isopropoxymagnesium halide, butoxymagnseium halide, and octoxymagnesium halide; and such aryloxymagnesium halides as phenoxymagnesium halide and methylphenoxymagnesium halide, for example. Of the above-named compounds, a mixture of two or more may also be used. These magnesium compounds may also be used effectively when they are in the form of a complex with other metals.

The above-listed halogenated magnesium compounds may be represented by simple chemical formulae, but exceptions may arise from differences in the methods for. producing the magnesium compounds. In such cases, they generally may be regarded as mixtures of these listed magnesium compounds. For example, the compounds obtained by reacting a magnesium compound with a polysiloxane compound, a halogen-containing silane compound, or alcohol; or the compounds obtained by reacting a magnesium metal with alcohol, phenol, or ether in the presence of halosilane, phosphor pentachloride, or thionyl chloride may also be used. The preferable magnesium compounds are magnesium halides, especially magnesium chloride; alkylmagnesium chlorides, preferably those that have a $C_1$~$C_{10}$ alkyl group; alkoxy magnesium chlorides, preferably those that have a $C_1$~$C_{10}$ alkoxy group; and aryloxy magnesium chlorides, preferably those that have a $C_6$~$C_{20}$ aryloxy group.

Examples of hydrocarbon solvents which may be used here include, for example: aliphatic hydrocarbons, such as pentane, hexane, heptane, octane, decane or kerosene; alicyclic hydrocarbons such as cyclobenzene, methylcyclobenzene, cyclohexane, or methylcyclohexane; aromatic hydrocarbons such as benzene, toluene, xylene, ethylbenzene, cumen, and cymene; and halogenated hydrocarbons such as dichloropropane, dichloroethylene, trichloroethylene, carbon tetrachloride, and chlorobenzene.

In conversion of the above-listed halogenated magnesium compounds into a magnesium compound solution, alcohol is used in the presence or absence of the above-listed hydrocarbons. The kinds of alcohol include alcohols having 1~20 carbons, such as methanol, ethanol, propanol, butanol, benzene alcohol, phenylethyl alcohol, isopropylenebenzyl alcohol, and cumyl alcohol; and preferably alcohols that have 1~12 carbons. The size of granules of the catalyst and the granular distribution in the resultant polymer vary according to the kinds and total quantity of alcohol, the kinds of magnesium compound, the ratio of magnesium to alcohol, etc.; but the total quantity of alcohol required for use to obtain the necessary magnesium solution is at least 0.5 mol, preferably about 1.0~20 mols, and more preferably about 2.0~10 mols to one mol of the magnesium compound.

The reaction of a halogenated magnesium compound and alcohol in production of the magnesium compound solution is performed preferably in a hydrocarbon medium for about 15 minutes to 5 hours, preferably for about 30 minutes to 4 hours, at about −25° C., preferably −10~200° C., and more preferably at about 0~150° C., though the temperature may vary according to the kind and quantity of alcohol in use.

The ester compounds that may be used as electron donors in production of the catalyst include, for example: unsaturated aliphatic acid esters containing at least one hydroxy group, such as 2-hydroxy ethylacrylate, 2-hydroxy ethylmethacrylate, 2-hydroxy propylacrylate, 2-hydroxy propylmethacrylate, 4-hydroxy butylacrylate, and pentaerythritol triacrylate; aliphatic monoesters and polyesters containing at least one hydroxy group, such as 2-hydroxy ethylacetate, methyl 3-hydroxy butylate, ethyl 3-hydroxy butylate, methyl 2-hydroxy isobutylate, ethyl 2-hydoxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butylisobutyl lactate, isobutyl lactate, ethylmandelate, dimethyl ethyl tartrate, ethyl tartrate, dibutyl tartrate, diethyl citrate, triethyl citrate, ethyl 2-hydroxy caproate, or diethyl bis-(hydroxy methyl) malonate; aromatic esters containing at least one hydroxy group, such as 2-hydroxy ethyl benzoate, 2-hydroxy ethyl salicylate, methyl 4-(hydroxy methyl) benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthenoate, monoethylene glycol monobenzoate, diethylene glycol monobenzoate, and triethylene glycol monobenzoate; and alicyclic esters containing at least one hydroxy group, such as hydroxy butyl lactone. The required quantity of any of these monoester compounds having at least one hydroxy group is 0.001~5 mols, preferably 0.01~2 mols to one mol of magnesium.

Of the silicon compounds having at least one alkoxy group, which may be used as another electron donor in production of the catalyst, a compound which may be represented by the general formula: $R^1{}_n Si(OR^2)_{4-n}$ (where $R^1$ and $R^2$ are hydrocarbons having 1~12 carbons, and "n" a natural number from 0 to 3) is preferable. In particular, such compounds may be used as: dimethyldimethoxysilane, dimethyidiethoxysilane, diphenyldimethoxysilane, methylphenyidimethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane, etc. The quantity of above said silicon compound is preferably 0.05~3 mols, and more preferably 0.1~2 mols, to one mol of magnesium.

The temperature for contact-reaction of the liquid magnesium compound with the ester compound having at least one hydroxy group and the silicon compound having at least one alkoxy group is preferably 0~100° C., and more preferably 10~70° C.

For crystallization of the catalyst particles, the magnesium compound solution which has been reacted with an electron donor is then reacted with a mixture of a liquid titanium compound represented by the general formula $Ti(OR)_a X_{4-a}$ (where R is a hydrocarbon group having 1 to 10 carbons, X a halogen atom, and a is a natural number from 0 to 4), and a silicon compound represented by the general formula $R_n SiCl_{4-n}$ (where R is hydrogen; an alkyl group having 1~10 carbons; an alkoxy, haloalkyl, aryl group, or halosillyl having 1~8 carbons; or a halosillylalkyl group; and n a natural number from 0 to 4).

Examples of titanium compounds which satisfy the above general formula $Ti(OR)_a X_{4-a}$ include: tetrahalogenated titaniums, such as $TiCl_4$, $TiBr_4$, and $TiI_4$; tri-halogenated alkoxy titaniums, such as $Ti(OCH_3)Cl_3$, $Ti(OC_2H_5)Cl_3$, $Ti(OC_2H_5)Br_3$, and $Ti(O(i\text{-}C_4H_3)Br_3$; dihalogenated alkoxy titaniums, such as $Ti(OCH_3)_2Cl_2$, $Ti(OC_2H_5)_2Cl_2$, $Ti(O(i\text{-}C_4H_9))_2Cl_2$, and $Ti(OC_2H_5)_2Br_2$; and tetraalkoxy titaniums, such as $Ti(OCH_3)_4$, $Ti(OC_2H_5)_4$, or $Ti(OC_4H_9)_4$. Mixtures of the above titanium compounds may also be used effectively. The preferable titanium compounds are halogen-containing compounds, and the more preferable are titanium tetrachlorides.

Examples of silicon compounds which satisfy the above general formula $R_n SiCl_{4-n}$ include: silicon tetrachloride; trichlorosilanes, such as methyltrichlorosilane, ethyltrichlorosilane, and phenyltrichlorosilane; dichlorosilanes, such as dimethyldichlorosilane, diethyldichlorosilane, diphenyldichlorosilane, and methylphenyldichlorosilane; and monochlorosilanes, such as trimethylchlorosilane. Mixtures of these silicon compounds may also be used. The preferable silicon compound is silicon tetrachloride.

The quantity of the mixture of a titanium compound and a silicon compound used for crystallization of the magnesium compound solution is preferably 0.1~200 mols to one mol of the magnesium compound, more preferably 0.1~100 mols, and still more preferably 0.2~80 mols. The molar ratio of titanium compound and silicon compound in the mixture is adequately 0.05~0.95, or more preferably 0.1~0.8. The shape and size of the crystallized solid constituent vary according to the conditions at the time of reaction of the magnesium compound solution and the mixture of titanium and silicon compounds. Therefore, the reaction of the magnesium compound solution and the mixture of titanium and silicon compounds is performed at a sufficiently low temperature, for formation of the solid constituent, preferably a contact-reaction at −70° C.~70° C., more preferably at −50° C.~50° C. After the contact-reaction, the temperature is gradually raised and the reaction is let to continue at 50° C.~150° C. for 0.5 hours to five hours.

The solid complex catalyst particles thus obtained may be further reacted with a titanium compound. The titanium compound for this further reaction is preferably a titanium halide, or a halogenated alkoxy titanium containing 1~20 carbons in the alkoxy group. A mixture of these may at times be used. Of these, titanium halides and halogenated alkoxy titaniums having 1~8 carbons in the alkoxy group are the more preferable, and yet more preferable are titanium tetrahalides.

The solid titanium catalyst may be profitably used in polymerization and copolymerization of ethylene. It is especially useful in homo-polymerization of ethylene and copolymerization of ethylene with (α-olefin having three or more carbons, such as propylene, 1-butene, 1-pentene, 4-methyl-1-pentene, and 1-hexene.

The polymerization reaction is for preparation of ethylene polymers or copolymers with the use of (1) the aforesaid solid titanium catalyst made from magnesium, titanium, a halogen, and an electron donor; (2) an organic metal compound of Group 2, 12, or 13 on the periodic table of elements; and (3) in the presence of an alkoxy silane compound as an external electron donor.

The aforesaid solid titanium catalyst can also be used to pre-polymerize ethylene or (α-olefin, prior to use as constituent in a polymerization reaction. The pre-polymerization can be performed in the presence of a hydrocarbon solvent like hexane, or else at a sufficiently low temperature and under the pressure conditions of ethylene or α-olefin in the presence of the aforesaid catalyst constituents and such an organic aluminum compound as triethylaluminum. Pre-polymerization makes catalyst granules wrapped in polymers to maintain the shape of the catalyst and thus helps to better the shape of the polymer after polymerization. The ratio in weight of polymer to catalyst after the pre-polymerization is usually 0.1:1~20:1.

Examples of organic metal compounds useful in the polymerization reaction may be represented by the general formula: $MR_n$, where M is a metal of Groups 2, 12, or 13 on the periodic table of elements, such as magnesium, calcium, zinc, boron, aluminum or gallium; R is an alkyl groups having 1 to 20 carbons, such as methyl, ethyl, butyl, hexyl, octyl, or decyl; and n is the valence of the metal atom. The more preferable organic metal compounds include: trialkylaluminums containing an alkyl group of 1 to 6 carbons, such as triethylaluminum and triisobutylaluminum. Their mixtures are also commendable. In some cases organic aluminum compounds containing one or more halogens or hydride groups, such as ethylaluminum dichloride, diethylaluminum chloride, ethylaluminum sesquichloride, or diisobutylaluminum hydride may be used. Mixtures of these organic metal compounds are also usable.

Generally, to secure the catalyst's best activity and the resultant polymer's best stereo-regularity in polymerization of α-olefin, and especially of propylene, many external electron donors are used. They include organic compounds containing atoms of oxygen, silicon, nitrogen, sulfur, and phosphorus such as organic acids, organic acid anhydrides, organic acid esters, alcohols, ethers, aldehydes, ketones, silanes, amines, amine oxides, amides, diols, ester phosphates, and mixtures of these. The electron donors useful in preparation of ethylene polymers having a narrow molecular weight distribution include: organic silicon compounds having an alkoxy group. These can be represented by the general formula: $R^1_a Si(OR^2)_{4-a}$, where $R^1$ and $R^2$ independently are alky groups containing 1~20 carbons, alicyclic groups, or an aryl groups; and a is a natural number 1 to 3. Examples of organic silicon compounds having the general formula $R^1_a Si(OR^2)_{4-a}$ include: aromatic silanes, such as diphenylmethoxysilane, phenyltrimethoxysilane, phenylethylmethoxysilane, phenylmethyldimethoxysilane; aliphatic silanes such as isobutyltrimethoxysilane, diisobutyldimethoxysilane, diisopropyldimethoxysilane, di-t-butyldimethoxysilane, t-butyltrimethoxysilane, cyclohexylmethyldimethoxysilane, dicyclopentyldimethoxysilane, dicyclohexyldimethoxysilane, 2-novonantriethoxysilane, vinyltriethoxysilane; and their mixtures. Of these silane compounds, alkylalkoxysilanes such as diisobutyldimethoxysilane; and cycloalkyldialkoxysilanes such as dicyclopentyldimethoxysilane have proven effective.

The polymerization reaction may be performed in the gas phase, in bulk in the absence of an organic solvent, or in a liquid slurry in the presence of an organic solvent. The reactions, however, are performed in the absence of oxygen, water, or any compounds that may act as catalytic poison.

In the case of liquid slurry polymerization, the preferable concentration of the solid titanium catalyst (1) is about 0.001~5 Mmols in terms of the number of the titanium atoms per one liter of the solvent, more preferably about 0.001~0.5 Mmols. For the solvent, alkanes or cycloalkanes, such as pentane, hexane, heptane, n-octane, isooctane, cyclohexane, and methylcyclohexane; alkylaromatics, such as toluene, xylene, ethylbenzene, isopropylbenzene, ethyltoluene, n-propylbenzene, and diethylbenzene; and halogenated aromatics, such as chlorobenzene, chloronaphthalene, or orthodichlorobenzene; and mixtures of these, may be useful.

In the case of gaseous polymerization, the quantity of the solid titanium catalyst (1), in terms of the number of titanium atoms in the catalyst per liter of polymerization reactor vessel, is about 0.001~5 Mmols, preferably about 0.001~1.0 Mmols, still more preferably about 0.01~0.5 Mmols.

The preferable concentration of the organic metal compound (2) is about 1~2000 mols, more preferably about 5~500 mols, in terms of the number of the atoms of the organic metal to one mol of the titanium atoms in the catalyst (1).

The concentration of the alkoxy silane compound (3) is preferably 0.01~40 mols and more preferably about 0.05~30 mols in terms of the number of the silicon atoms per mol of the organic metal's atoms in the organic metal compound.

To secure a high speed in polymerization the reaction is performed at a sufficiently high temperature regardless of the polymerization process itself. Generally, about 20~200° C. is adequate, and 20~95° C. is preferable. The pressure of a monomer is adequately 1 atm to 100 atm, and more preferably 2~50 atm.

The molecular weights of the polymer examples below are given in terms of the broadly known American Society For Testing and Materials (ASTM) D 1238. In ASTM, the smaller the molecular weights are the larger the ASTM values are. The molecular weight distribution was obtained through measurement by Gel Permeation Chromatography (GPC), a measurement method widely adopted in the art.

The present invention is described in further detail below through the use of examples and comparative examples, but should not be construed to be limited or confined to these examples.

EXAMPLE 1

Production of the Catalyst

A solid complex titanium catalyst was prepared through the following three steps:

Step (i): Production of a Magnesium Solution

Into a 1.0-liter reactor equipped with a mechanical stirrer, substituted to nitrogen atmosphere, 9.5 g of $MgCl_2$ and 500 ml of decane were put and stirred at 500 rpm. 72 ml of 2-ethylhexanol was added thereto, and the temperature was raised to 110° C. the reaction was allowed to continue for three hours. The homogeneous solution obtained by the reaction was cooled to room temperature (25° C.).

Step (ii): Contact-reaction of the Magnesium Solution With Ester Containing a Hydroxy Group and a Silicon Compound Containing an Alkoxy Group To the said magnesium solution cooled to room temperature were added 1.4 ml (10 Mmols) of 2-hydroxyethylmethacrylate and 10.0 ml (45 Mmols) of silicon tetraethoxide, and the solution was left to react for one hour.

Step (iii): Treatment With a Mixture of a Titanium Compound and a Silicon Compound The above solution was adjusted to room temperature (25° C.), and to it a mixture of 70 ml of titanium tetrachloride and 70 ml of silicon tetrachloride was dripped for two hours. After the dripping, the reactor was heated over a one hour period to 80° C., while being stirred. The reactor was kept at that temperature for another hour. The stirring was stopped, and the supernatant was separated. 300 ml of toluene and 100 ml of titanium tetrachloride were instilled in continuation to the solid layer left behind. The temperature was raised to 100° C. and kept there for two hours. After the reaction the reactor was cooled to room temperature, and washed in 400 ml of hexane until the remaining unreacted titanium tetrachloride was completely removed. The titanium content of the thus prepared solid catalyst was 4.7%.

Polymerization

After a 2-liter high pressure reactor was dried in an oven, it was assembled while hot. By alternating treatments with nitrogen and evacuation three times, the inside of the reactor was converted into nitrogen atmosphere. 1,000 ml of n-hexane was put into the reactor. 2 Mmols of triethylaluminum, 0.1 Mmol of dicyclohexylmethyldimethoxysilane, and 0.03 Mmol of the solid catalyst in terms of the number of titanium atoms, were added, followed by the addition of 2,000 ml of hydrogen. As the reactor was stirred at 700 rpm, the temperature of the reactor was raised to 80° C., and after the pressure of ethylene was adjusted to 120 psi. Polymerization was allowed to continue for one hour. After the polymerization, the reactor was cooled to room temperature, and a small amount of ethanol was added. The thus prepared polymer was then collected by separation, dried in a vacuum oven at 50° C. for at least six hours, to finally obtain polyethylene in the form of white powder.

The polymerization activity (kg polyethylene/g catalyst) was calculated in terms of the ratio of the weight (g) of the used catalyst to the produced polymer (kg). The results of the polymerization along with the bulk density (g/ml), melting index, and molecular weight distribution are shown in Table 1.

EXAMPLE 2

Using the catalyst prepared in Example 1, polymerization was carried out in the same way as Example 1 with the only exception that 0.1 Mmol of. dicyclopentyldimethoxysilane was used instead of dicyclohexylmethyldimethoxysilane. The results are given in Table 1.

EXAMPLE 3

Using the catalyst prepared in Example 1, polymerization was carried out in the same way as Example 1 with the only exception that 0.1 Mmol of diisopropyldimethoxysilane was used instead of dicyclohexylmethyldimethoxysilane. The results are given in Table 1.

EXAMPLE 4

Using the catalyst prepared in Example 1, polymerization was carried out in the same way as Example 1 with the only exception that 0.1 Mmol of phenyltriethoxysilane was used instead of dicyclohexylmethyldimethoxysilane. The results are given in Table 1.

EXAMPLE 5

Using the catalyst prepared in Example 1, polymerization was carried out in the same way as Example 1 with the only exception that 0.1 Mmol of propyltriethoxysilane was used instead of dicyclohexylmethyldimethoxysilane. The results are given in Table

EXAMPLE 6

Using the catalyst prepared in Example 1, polymerization was carried out in the same way as Example 1 with the only exception that 0.1 Mmol of t-butyltriethoxysilane was used instead of dicyclohexylmethyldimethoxysilane. The results are given in Table 1.

EXAMPLE 7

Using the catalyst prepared in Example 1, polymerization was carried out in the same way as Example 1 with the only exception that 0.5 Mmol of dicyclopentyldimethoxysilane was used instead of dicyclohexylmethyldimethoxysilane. The results are given in Table 1.

EXAMPLE 8

Using the catalyst prepared in Example 1, polymerization was carried out in the same way as Example 1 with the only exception that 0.3 Mmol of dicyclopentyldimethoxysilane was used instead of dicyclohexylmethyldimethoxysilane. The results are given in Table 1.

EXAMPLE 9

Using the catalyst prepared in Example 1, polymerization was carried out in the same way as Example 1 with the only exception that 1,000 ml of hydrogen was used in the process for polymerization. The results are given in Table 1.

EXAMPLE 10

Using the catalyst prepared in Example 1, polymerization was carried out in the same way as Example 1 with the only exception that 3,000 ml of hydrogen was used in the process for polymerization. The results are given in Table 1.

COMPARATIVE EXAMPLE 1

Polymerization was carried out in the same way as in Example 1 with the only exception that the catalyst prepared in Example 1 and dicyclohexylmethyldimethoxysilane were not used in the process of polymerization in Example 1. The results are given in Table 1.

COMPARATIVE EXAMPLE 2

Catalyst was produced without using 2-hydroxyethylmethacrylate and silicon tetraethoxide in Step (ii) of the process for preparing the catalyst in Example 1. The content of titanium in the thus produced catalyst was 4.7%. Polymerization was carried out under the same condition as Example 1. The results are given in Table 1.

COMPARATIVE EXAMPLE 3

Catalyst was produced using 10 ml of silicon tetraethoxide but not 2-hydroxyethylmethacrylate in Step (ii) of the process for preparing the catalyst in Example 1. The content of titanium in the thus produced catalyst was 4.5%. Polymerization was carried out under the same conditions as Example 1. The results are given in Table 1.

COMPARATIVE EXAMPLE 4

Catalyst was produced using 1.4 ml of 2-hydroxyethylmethacrylate but not silicon tetraethoxide in Step (ii) of the process for preparing the catalyst in Example 1. The content of titanium in the thus produced catalyst was 4.4%. Polymerization was carried out under the same conditions as Example 1. The results are given in Table 1.

TABLE 1

| | | Polymerization Results | | |
|---|---|---|---|---|
| Examples | Activity* | Bulk Density (g/ml) | Melting Index (g/10 min) | Molecular Weight Distribution (Mw/Mn) |
| 1 | 10.9 | 0.39 | 4.2 | 4.1 |
| 2 | 11.6 | 0.38 | 4.1 | 3.9 |
| 3 | 11.2 | 0.37 | 4.3 | 3.7 |
| 4 | 10.8 | 0.38 | 3.9 | 4 |
| 5 | 10.6 | 0.39 | 4.4 | 4.3 |
| 6 | 10.9 | 0.38 | 4.2 | 4.3 |
| 7 | 12.7 | 0.37 | 4.6 | 3.9 |
| 8 | 10.9 | 0.4 | 3.7 | 3.6 |
| 9 | 14.7 | 0.37 | 0.7 | 4.1 |
| 10 | 7.9 | 0.4 | 15.7 | 3.9 |
| Comp 1 | 9.7 | 0.37 | 4.8 | 6.5 |
| Comp 2 | 7.7 | 0.32 | 1.7 | 5.8 |
| Comp 3 | 8.2 | 0.34 | 1.9 | 6.1 |
| Comp 4 | 9 | 0.33 | 2.8 | 5.7 |

*(Kg PE/g catalyst)

As shown in the table above, it has been possible to obtain, by the method in the present invention, a catalyst of high catalytic activity as well as ethylene polymers and copolmers having high bulk density and a narrow molecular weight distribution.

Further modification and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing ethylene homo- or co-polymers, which comprises:
   a. producing a solid titanium catalyst by:
      i. producing a magnesium compound solution by contact-reacting a halogenated magnesium compound with alcohol;
      ii. reacting said magnesium compound solution with an ester compound having at least one hydroxy group, and a silicon compound having at least one alkoxy group; and
      iii. reacting the product of Step (ii) with a mixture of a first titanium compound and a silicon compound; and
      iv. reacting the product of Step(iii) with a second titanium compound
   b. producing ethylene homo- or copolymers in the presence of the solid titanium catalyst, an organometallic compound of Group 2, 12, or 13 of the Periodical Table, and an alkoxy silane compound.

2. The method of claim 1, wherein the ester compound having at least one hydroxyl group comprises: an unsaturated aliphatic acid ester having at least one hydroxyl group; an aliphatic monoester or polyester having at least one hydroxyl group; an aromatic ester having at least one hydroxyl group; or an alicyclic ester compound having at least one hydroxyl group.

3. The method of claim 1, wherein the first titanium compound and the second titanium compound are compounds represented by the general formula $Ti(OR)_aX_{4-a}$, where R is an alkyl group having 1~10 carbon atoms, X is a halogen atom, and a is an integer of 0~4.

4. The method of claim 1, wherein the first titanium compound and the second titanium compound comprises: a 4-halogenated titanium; a 3-halogenated alkoxytitanium; a 2-halogenated alkoxytitanium; or a tetralkoxy titanium.

5. The method of claim 1, wherein the first and second titanium compounds are titanium tetrachloride, and the silicon compound is silicon tetrachloride.

6. The method of claim 1, wherein the alkoxysilane compound is a compound represented by the general formula $R^1_aSi(OR^2)_{4-a}$, where $R^1$ and $R^2$ independently are an alkyl group having 1~20 carbons, an alicyclic, or an aryl group; and a is a natural number 1 to 3.

7. The method of claim 1, where the ester compound having at least one hydroxyl group comprises: 2-hydroxy ethylacrylate; 2-hydroxy ethylmethacrylate; 2-hydroxy propylacrylate; 2-hydroxy propylmethacrylate; 4-hydroxy butylacrylate; pentaerithritol triacrylate; 2-hydroxy ethyl acetate; methyl 3-hydroxy butylate; ethyl 3-hydroxy butylate; methyl 2-hydroxy isobutylate; ethyl 2-hydroxy isobutylate, methyl-3-hydroxy-2-methyl propionate; 2,2-dimethyl-3-hydroxy propionate; ethyl-6-hydroxy hexanoate; t-butyl-2-hydroxy isobutylate; diethyl-3-hydroxy glutarate, ethyl-lactate; isopropyl lactate; butyl-isobutyl lactate; isobutyl lactate; ethyl mandelate; dimethyl ethyl tartrate; ethyl tartrate; dibutyl tartrate; diethyl citrate; triethyl citrate; ethyl-2-hydroxy-caproate; diethyl bis-(hydroxymethyl) malonate; 2-hydroxy ethyl benzoate; 2-hydroxy ethyl salicylate; methyl-4-(hydroxyl methyl) benzoate; methyl-4-hydroxy benzoate; ethyl-3-hydroxy benzoate; 4-methyl salicylate; ethyl salicylate; phenyl salicylate; propyl-4-hydroxy benzoate; phenyl-3-hydroxy naphthanoate; monoethylene glycol monobenzoate; diethylene glycol monobenzoate; triethylene glycol monobenzoate; or hydroxyl butyl-lactonel.

8. The method of claim 1, where the silicon compound having alkoxy groups is a compound of a general formula of $R^1{}_nSi(OR^2)_{4-n}$, in which $R^1$ and $R^2$ respectively are hydrocarbon groups having 1~12 carbon atoms, and n is a natural number of 0~3.

9. The method of claim 1, where the silicon compound having alkoxy groups comprises: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, or methyltriaryloxylsilane.

10. The method of claim 1, where the silicon compound is a compound represented by a general formula $R_nSiCl_{4-n}$, where R is: hydrogen; an aryl, alkoxy, haloalkyl or alkyl group having 1~10 carbon atoms; or a halosilylalkyl or halosilyl group having 1~8 carbon atoms; and n is an integer of 0~4.

11. The method of claim 1, where the silicon compound comprises: silicon tetrachloride; a trichlorosilane; a dichlorosilane; or a monochlorosilane.

12. The method of claim 1, where the silicon compound comprises: trichlorosilane, methyltrichlorosilane, ethyltrichlorosilane, phenyl-trichlorosilane dimethylchlorosilane, diethyldichlorosilane, diphenyldichlorosilane, methylphenyldichlorosilane, or trimethylchlorosilane.

13. The method of claim 1, where the first titanium compound and the second titanium compound comprises $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(I—C_4H_9)Br_3$, $Ti(OCH_3)_2Cl_2$, $Ti(OC_2H_5)_2Cl_2$, $Ti(O(I—C_4H_9)_2)Cl_2$, $Ti(OC_2H_5)_2Br_2$, $Ti(OCH_3)_4$, $Ti(OC_2H_5)_4$, or $Ti(OC_4H_9)_4$.

14. The method of claim 1, where the alkoxysilane compound comprises: an aromatic silane; an aliphatic silane; or mixtures thereof.

15. The method of claim 1, where the alkoxysilane compound comprises: diphenylmethoxysilane, phenyltrimethoxysilane, phenylethylmethoxysilane, phenylmethyldimethoxysilane, isobutyltrimethoxysilane, diisobutyldimethoxysilane, diisopropyldimethoxysilane, di-t-butyldimethoxysilane, t-butyltrimethoxysilane, cyclohexylmethyldimethoxysilane, dicyclopentyldimethoxysilane, dicyclohexyldimethoxysilane, 2-novonantriethoxysilane, 2-novonanmethyldimethoxysilane, or vinyltriethoxysilane.

16. The method of claim 1, where the halogenated magnesium compound comprises: dihalogenated magnesiums, alkylmagnesium halides, alkoxymagnesium halides, aryloxymagnesium halides, or magnesium compounds in the form of a complex with other metals.

17. The method of claim 1, where the halogenated magnesium compound comprises: magnesium chloride, magnesium iodide, magnesium fluoride, magnesium bromide, methylmagnesium halide, ethylmagnesium halide, propylmagnesium halide, butylmagnesium halide, isobutylmagnesium halide, hexylmagnesium halide, or amylmagnesium halide, methoxymagnesium halide, ethoxymagnesium halide, isopropoxymagnesium halide, butoxymagnseium halide, octoxymagnesium halide, phenoxymagnesium halide or methylphenoxymagnesium halide.

18. The method of claim 1, where the organometallic compound comprises a compound represented by the general formula $MR_n$; where M is a metal of Group 2, 12, or 13 on the periodic table of elements, R is an alkyl groups having 1 to 20 carbons, and n is the valence of the metal atom.

19. The method of claim 1, where the organometallic compound comprises: triethylaluminum triisobutylaluminum, ethylaluminum dichloride, diethylaluminum chloride, ethylaluminum sesquichloride, diisobutylaluminum hydride, or mixtures thereof.

20. The method of claim 1, where before being used in the polymerization, the catalyst is pre-polymerized in the presence of an organic aluminum compound and a hydrocarbon solvent.

21. The method of claim 20, where the organic aluminum compound comprises triethylaluminum.

* * * * *